(12) United States Patent
Ho et al.

(10) Patent No.: US 7,100,178 B2
(45) Date of Patent: Aug. 29, 2006

(54) LOADING AND UNLOADING MODULE WITH TRACK PLATE, MOVING PLATE AND GUIDING PLATE FOR OPTICAL DISK DRIVES

(75) Inventors: Wen-Jen Ho, Hsinchu (TW); Chen-Yuan Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 453 days.

(21) Appl. No.: 10/670,574

(22) Filed: Sep. 26, 2003

(65) Prior Publication Data
US 2005/0028179 A1 Feb. 3, 2005

(30) Foreign Application Priority Data
Aug. 1, 2003 (TW) .............................. 92121176 A

(51) Int. Cl.
*G11B 17/51* (2006.01)
*G11B 17/28* (2006.01)

(52) U.S. Cl. ....................................... 720/621; 720/616

(58) Field of Classification Search ................ 720/621, 720/620, 619, 617, 600, 626, 616
See application file for complete search history.

(56) References Cited

U.S. PATENT DOCUMENTS

| 6,167,015 A  * | 12/2000 | Jeong ........................ 720/623 |
| 6,414,927 B1 | 7/2002 | Ota ........................ 369/53.41 |
| 6,449,234 B1 | 9/2002 | Ahn et al. .................. 720/619 |
| 2004/0008602 A1* | 1/2004 | Suzuki ....................... 369/77.1 |

* cited by examiner

*Primary Examiner*—Julie Anne Watko
(74) *Attorney, Agent, or Firm*—Birch, Stewart, Kolasch & Birch, LLP

(57) ABSTRACT

A loading and unloading module for optical disk drives includes a track plate, a moving plate, a guiding plate, a guiding arm and three rollers for three-point anchoring to achieve the functions of retrieving a disc, conveying the disc and ejecting the disc to substitute for conventional tray loading type or leaf-actuation loading type designs. The optical module is prevented from being scraped or damaged, and space utilization is improved. It also is adaptable for handling different sizes of discs.

17 Claims, 23 Drawing Sheets

LOADING AND UNLOADING MODULE WITH TRACK PLATE, MOVING PLATE AND GUIDING PLATE FOR OPTICAL DISK DRIVES

This nonprovisional application claims priority under 35 U.S.C. § 119(a) on Patent Application No. 092121176 filed in TAIWAN on Aug. 1, 2003, which is herein incorporated by reference.

FIELD OF THE INVENTION

The invention relates to a loading and unloading module for optical disk drives and particularly to an slot-in type loading and unloading module adaptable for discs of various sizes in optical disk drives.

BACKGROUND OF THE INVENTION

The commonly seen optical disk drives at present can be categorized as tray loading type and leaf-actuation loading type. The former type is usually used on desktop computers, while the later type is mostly adopted on notebook computers. The tray loading type requires greater space. When in use, the tray has to be ejected for loading the optical disc, and the tray is withdrawn into the optical disk drive for reading. Ejection of the tray requires a lot of space. Moreover, impact may occur and damage the disk drive. If the optical disc is not properly positioned when the tray is withdrawn, the optical disc will be jammed between the tray and the optical disk drive.

The leaf-actuation loading type is generally used when space is constrained. It is mostly used in notebook computers. However, during ejection the optical module and the tray are ejected together. If a slight error happens while placing or removing the optical disc, the optical module is easily scraped and damaged, and could result in dysfunction of the optical disk drive.

In order to overcome the aforesaid disadvantages, U.S. Pat. No. 6,414,927 discloses a roller loading method. Its main design concept is to deploy an elongated roller on the exit of the optical disc drive. When an optical disc is inserted, the roller conveys the optical disc to a correct position by friction. As it is driven by roller friction, it can be adapted to optical discs of various sizes (commonly 8 cm and 12 cm). However, because it is driven by roller friction, the surface of the disc is frequently scraped and damaged during the conveying process. Moreover, if the roller is smeared by dust or external objects, it could cut into the disc surface and cause serious damage.

U.S. Pat. No. 6,449,234 discloses another type of loading scheme that uses an actuating lever to move the optical disc. While it can save the tray and avoid the problem of scraping the disc surface occurring with U.S. Pat. No. 6,414,927, it cannot be adapted for different sizes of discs.

SUMMARY OF THE INVENTION

In view of the aforesaid disadvantages, the primary object of the invention is to provide a loading and unloading module for optical disk drives to substitute for the conventional tray loading or leaf-actuation loading design to prevent the optical module from being scraped and damaged, improve space utilization, and to be adaptable to different sizes of discs.

The loading and unloading module of the invention includes a track plate, a moving plate, a guiding plate, a guiding arm and three rollers. The track plate has two biased main tracks located on two sides of the front end extending rearwards and a rear track on a rear end thereof. Each main track has a side dead point on the outmost side, a front dead point on the front end and a rear dead point on the rear end. The moving plate is movably mounted onto the track plate, has a bottom track corresponding to the rear track, and a first track matching the biased main track. The guiding plate is mounted onto the moving plate and is connected thereon by an elastic mechanism. It has transverse tracks on two sides of the front end normal to the entering direction of the disc. The guiding arm is mounted onto the guiding plate and has a rear end coupled with the moving plate and anchored on a pivotal fulcrum.

The three rollers are divided into two front rollers and one rear roller according to the locations at which they are installed. The front rollers pass through the main tracks of the track plate, the first tracks of the moving plate and the transverse tracks of the guiding plate. The rear roller passes through the rear track of the track plate, the bottom track of the moving plate and the rear track of the guiding arm, and is harnessed to move synchronously with the front rollers.

When a disc is inserted, the two front rollers are pushed to the side dead points of the main tracks, and the guiding plate is driven at the same time to slide rearwards. Due to the elastic force of the elastic mechanism, the disc is moved inwards to be clamped by the front rollers and the rear roller. Then the moving plate is driven to convey the disc into the optical disk drive until the front rollers are moved to the rear dead points to release the disc for reading. After reading is finished, the moving plate is driven to move the disc outwards until the front rollers are moved to the front dead points of the main track to discharge the disc, then the elastic mechanism may unload the disc.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
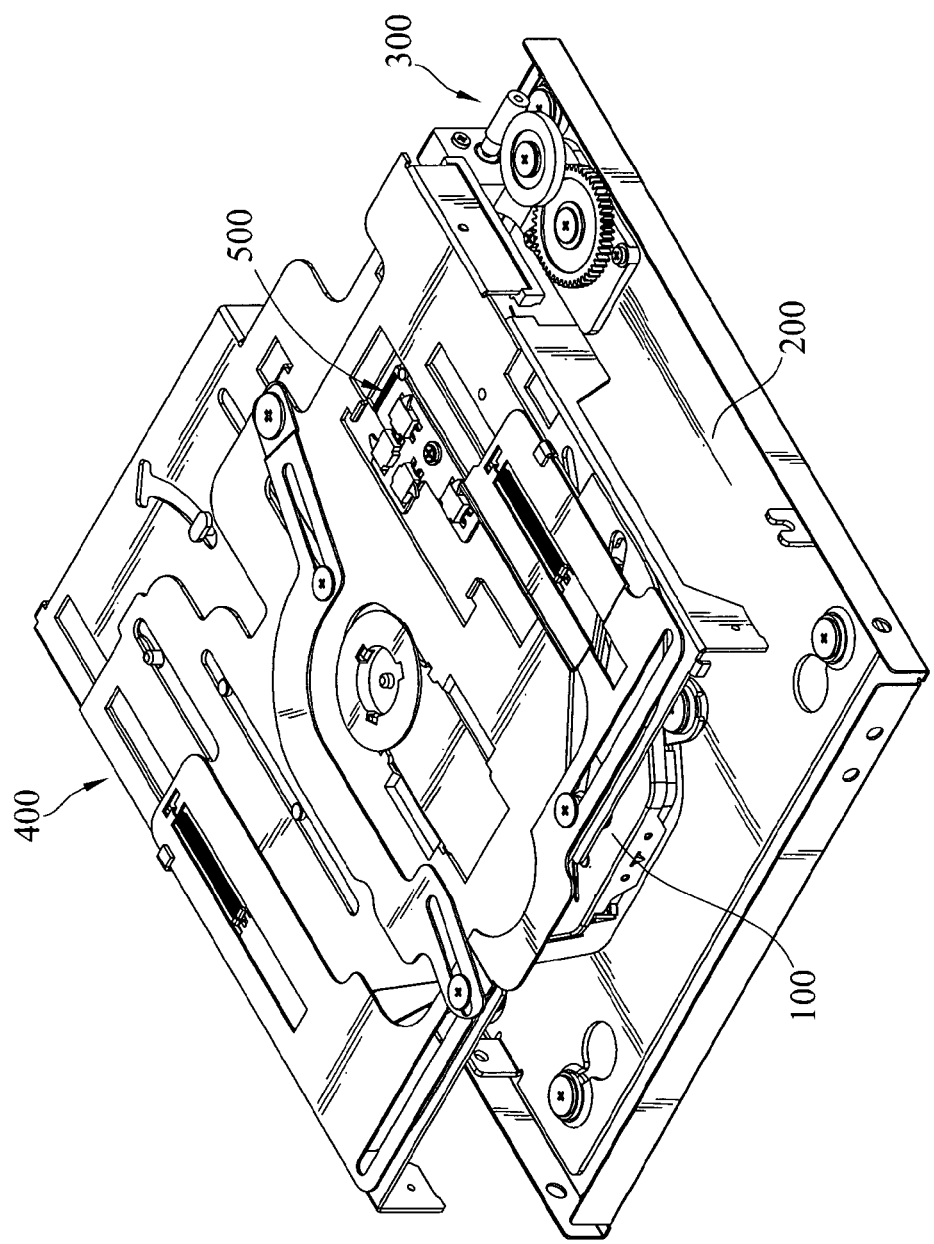
FIGS. 1A through 1B are schematic views of the invention coupling with an optical disk drive.

Refer to FIG. 1A for the loading and unloading module 400 for optical disk drives according to the invention. The module is mainly used in an optical disk drive to couple with an optical module 100, bottom plate module 200, driving module 300 and detection module 500. The bottom plate module 200 mainly aims to support the optical module 100, driving module 300 and loading and unloading module 400.

The optical module 100 includes an optical pickup, spindle motor and transmission system (not shown in the drawing) for reading the optical disc. The driving module 300 provides power required by the loading and unloading module 400. The following description focuses mainly the loading and unloading module 400.

Figure 1B:
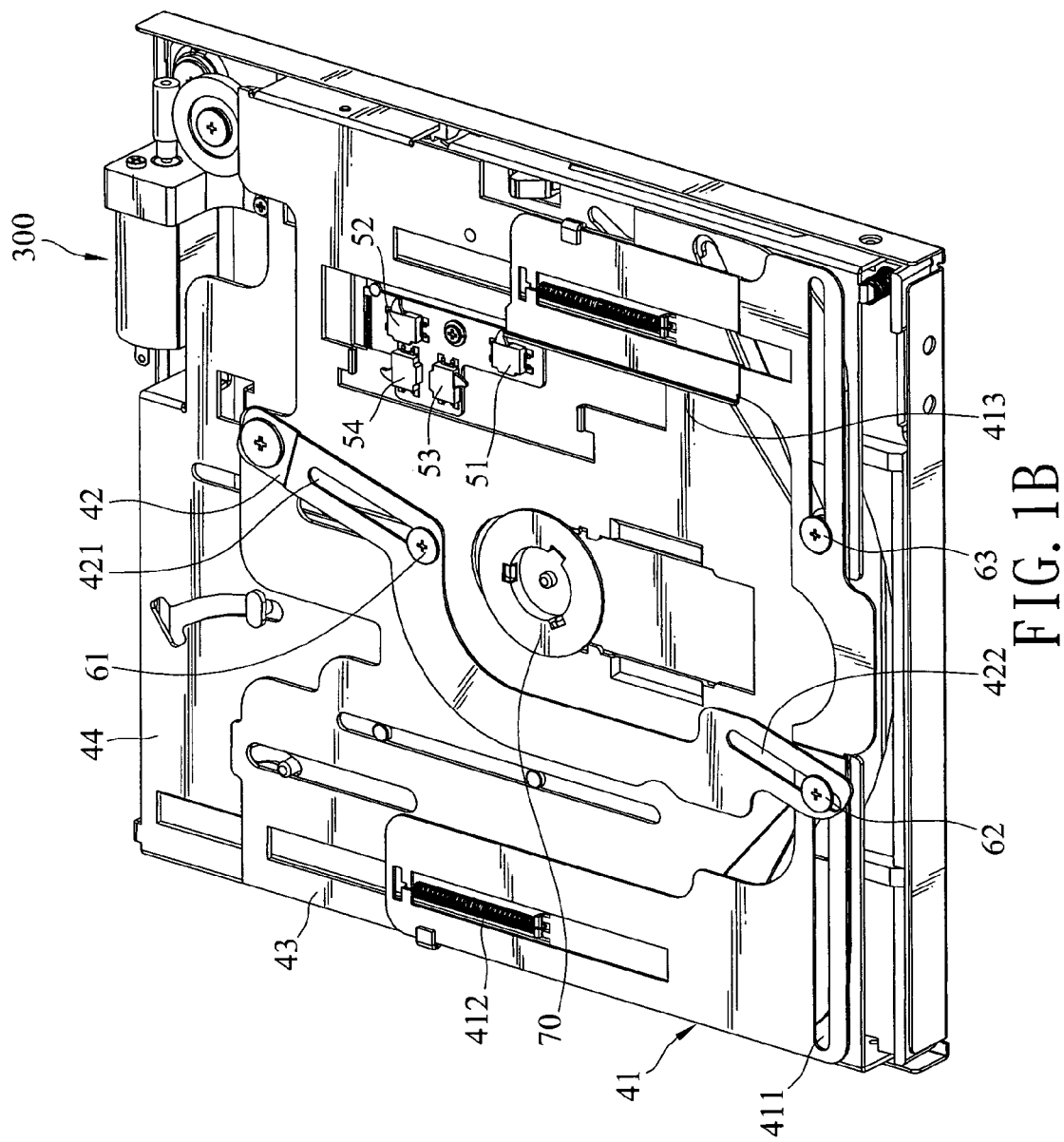
Figure 3:
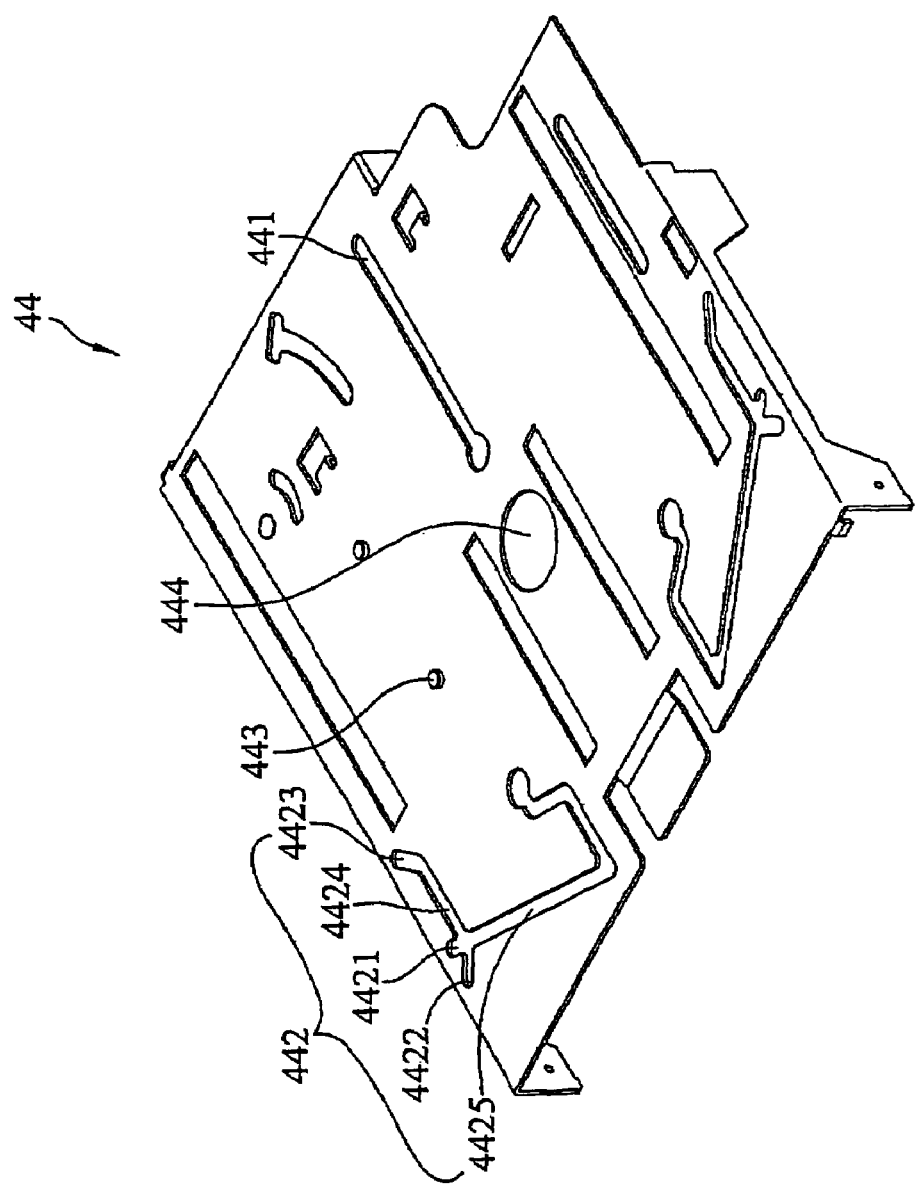
FIG. 3 is a schematic view of the track plate of the invention.
Figure 5:
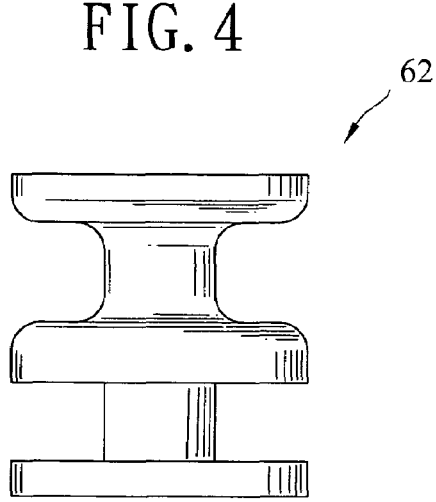
FIG. 5 is a schematic view of the rollers of the invention.

The loading and unloading module 400 includes a track plate 44, a moving plate 43, a guiding plate 41, and a guiding arm 42 stacking and assembling in this order. Referring to FIG. 1B, three rollers 61, 62 and 63 are provided (also referring to FIG. 5) to offer a three-point anchoring approach to clamp the optical disc. The loading and unloading module of the invention aims to convey a disc into or out of an optical disk drive. It includes a track plate 44, a moving plate 43, a guiding plate 41, two front rollers 62 and 63, a rear roller 61, and a guiding arm 42. The track plate 44 located on the bottom is formed by a metal sheet. Referring to FIG. 3, it has a rear track 441 to couple with the rear roller 61 and guiding tracks 442 to couple with the front rollers 62. As operations of the front rollers 62 and 63 are the same, only the front roller 62 will be discussed. The rear roller 61 is movably located in the rear track 441 of the track plate 44 and the bottom track 432 of the moving plate 43. Moreover, the guiding track 442 includes a main track 4425 and a secondary track 4424 to support respectively large discs and small discs. The guiding tracks 442 are symmetrically formed on two sides of the front end of the track plate 44. The rear track 441 is located on the rear end of the track plate 44.

Figure 2:
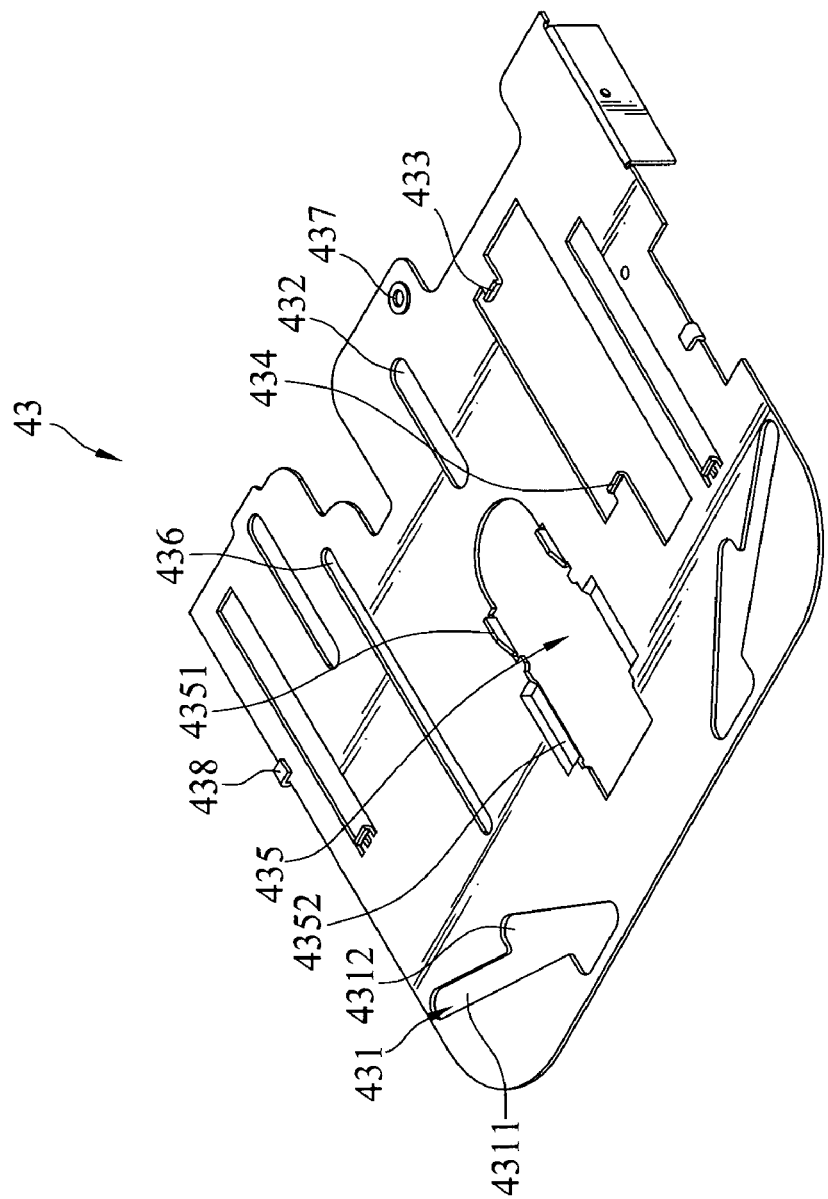
FIG. 2 is a schematic view of the moving plate of the invention.

The movable plate 43 has a bottom track 432 and a moving track 431 at the front end, as shown in FIG. 2. The moving track 431 has first tracks 4311 and second tracks 4312 for supporting respectively large discs and small discs. It has an opening 435 in the center to enable a damper 70 of the optical disk drive to pass through (also passing through an aperture 444 in the center of the track plate 44, as shown in FIG. 3). The moving plate 43 may be driven by the driving module 300 and moved. It has an anchor track 436 mating with a plurality of anchor bulged points 443 located on the track plate 44 (referring to FIG. 3) to allow the moving plate 43 to move forwards and backwards relative to the track plate 44. In other words, the moving plate 43 is movably mounted above the track plate 44. The bottom track 432 on the rear end corresponds to the rear track 441. The moving plate 43 further has moving tracks 431 symmetrically located on two sides corresponding to the guiding tracks 442.

Referring to FIG. 1B, the guiding plate 41 is substantially formed in a U-shape, and is held by a clamping section 438 at the edge of the moving plate 43 and anchored on the moving plate 43 (also referring to FIG. 2). It has two sides connecting to the moving plate 43 through springs 412 which control the relative position of the two. The guiding plate 41 further has transverse tracks 411 located on two sides of the front end that are substantially normal to the inserting direction of the disc. That is, the guiding plate 41 is located above the moving plate 43 with the transverse tracks 411 located horizontally on two sides at the front end thereof.

Preferably, the moving plate 43 and the guiding plate 41 are connected through an elastic mechanism 412 to enable the two to move reciprocally and elastically relative to one another.

The guiding arm 42 is located above the guiding plate 41, and is movably located above the moving plate 43 and pivotally connected thereon. The guiding arm 42 is a biased arm which has one bottom end pivotally engaged with a pivot point 437 on the moving plate 43 (referring to FIG. 2). The guiding arm 42 further has a front end track 421 and a rear end track 422 to couple respectively with the front roller 62 and the rear roller 61. That is, the front roller 62 are coupled respectively in the guiding tracks 442 of the track plate 44, moving tracks 431 of the moving plate 43 and transverse tracks 411 of the guiding plate 41. As the front rollers 62 and 63 are symmetrical on the left and right sides, and are movable synchronously under the control of the guiding plate 41, in order to enable another roller 61 to move synchronously with the two rollers 62 and 63, the guiding arm 42 is provided.

Figure 6A:
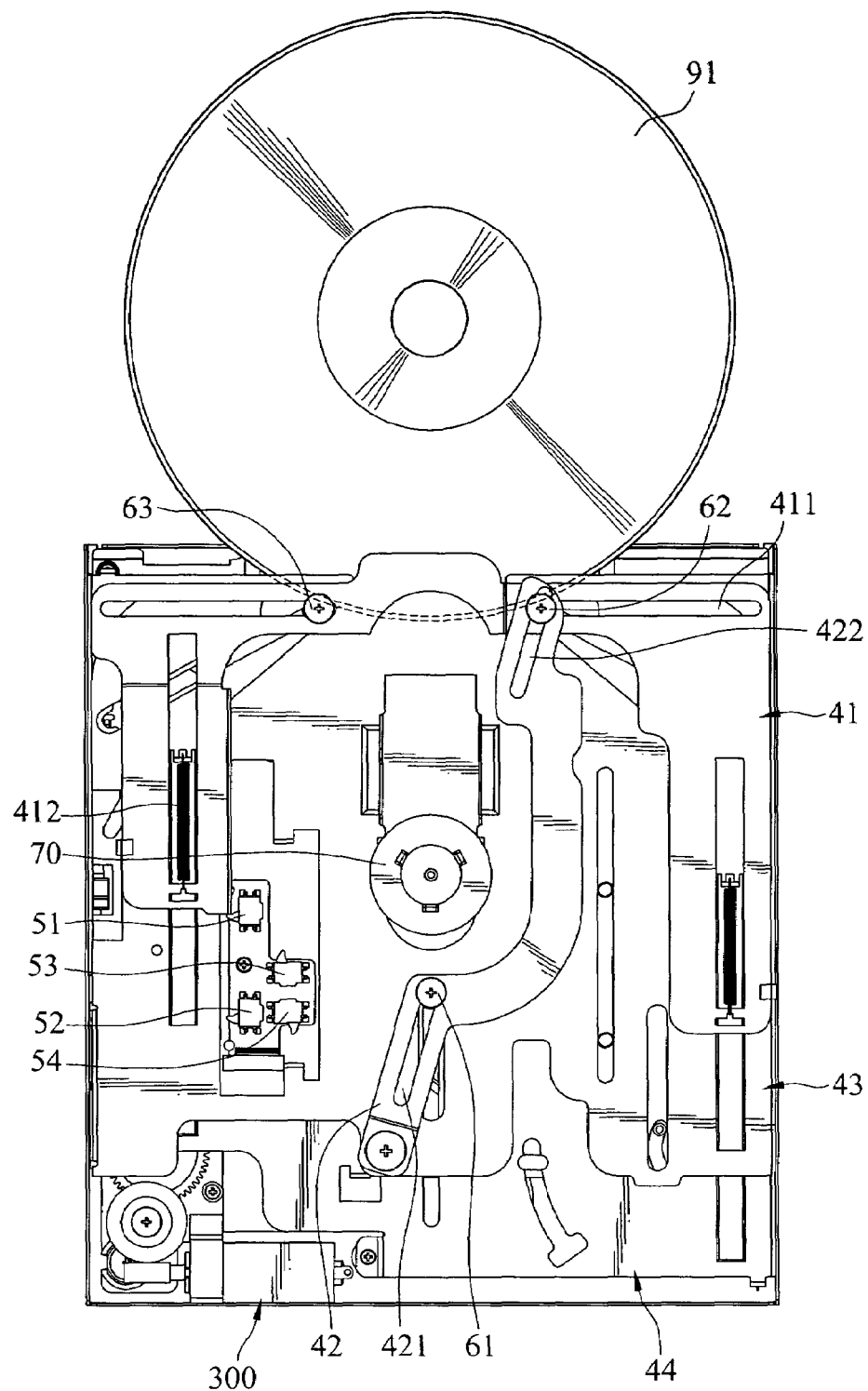
FIGS. 6A through 6H are schematic views of the invention in operating conditions adopted for large discs.
Figure 6B:
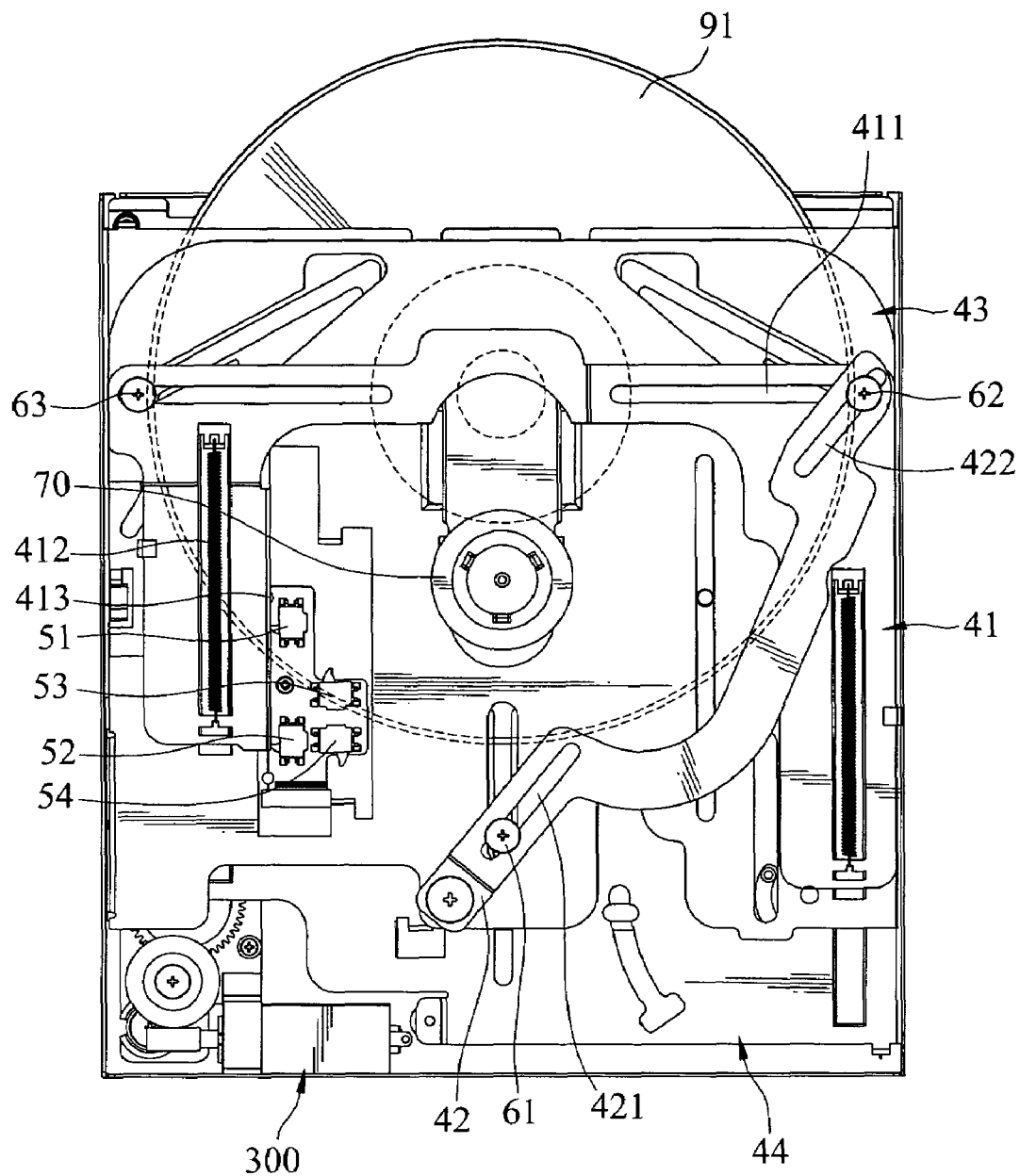
Figure 6C:
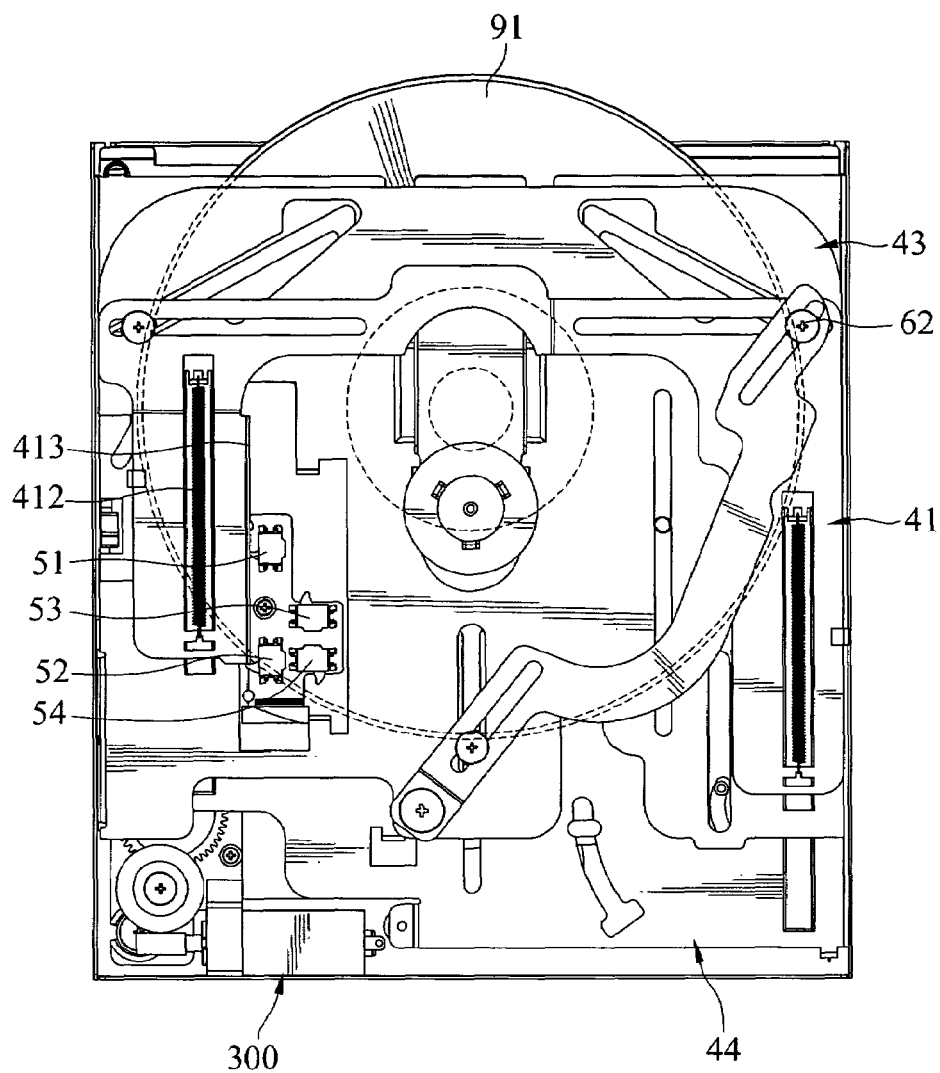

When adopted for use on large discs, a large disc 91 (the most common size is 12 cm) is loaded at the front end as shown in FIG. 6A. First, the disc is in contact with the rollers 62 and 63 (also referring to FIG. 8); with the large disc 91 being moved inwards continuously, the rollers 62 and 63 are pushed and moved. As the rollers 62 and 63 are constrained by the transverse tracks 411 of the guiding plate 41, moving tracks 431 of the moving plate 43 and guiding tracks 442 of the track plate 44, the rollers 62 and 63 are moved along the first tracks 4311 of the moving tracks 431 of the moving plate 43 and the main tracks 4425 of the guiding tracks 442 of the track plate 44 towards two sides. Meanwhile, the transverse tracks 411 of the guiding plate 41 are being pushed and the entire body is moved rearwards to stretch the spring 412, as shown in FIG. 6B. The roller 61 is also constrained by the guiding arm 42 and moved synchronously rearwards. When the large disc 91 is continuously moved inwards and has its largest diameter passing through, the rollers 62 and 63 are pushed to the side dead points 4421 of the main tracks 4425 of the guiding track 442 to enable the large disc 91 to be moved in continuously (referring to FIG. 6B). Once the large disc passes through, due to the force of the spring 412, the guiding plate 41 is moved forwards to continuously convey the large disc 91 inwards, as shown in FIG. 6C, until the large disc 91 is clamped and anchored at three points by the three rollers 61, 62 and 63.

Figure 6D:
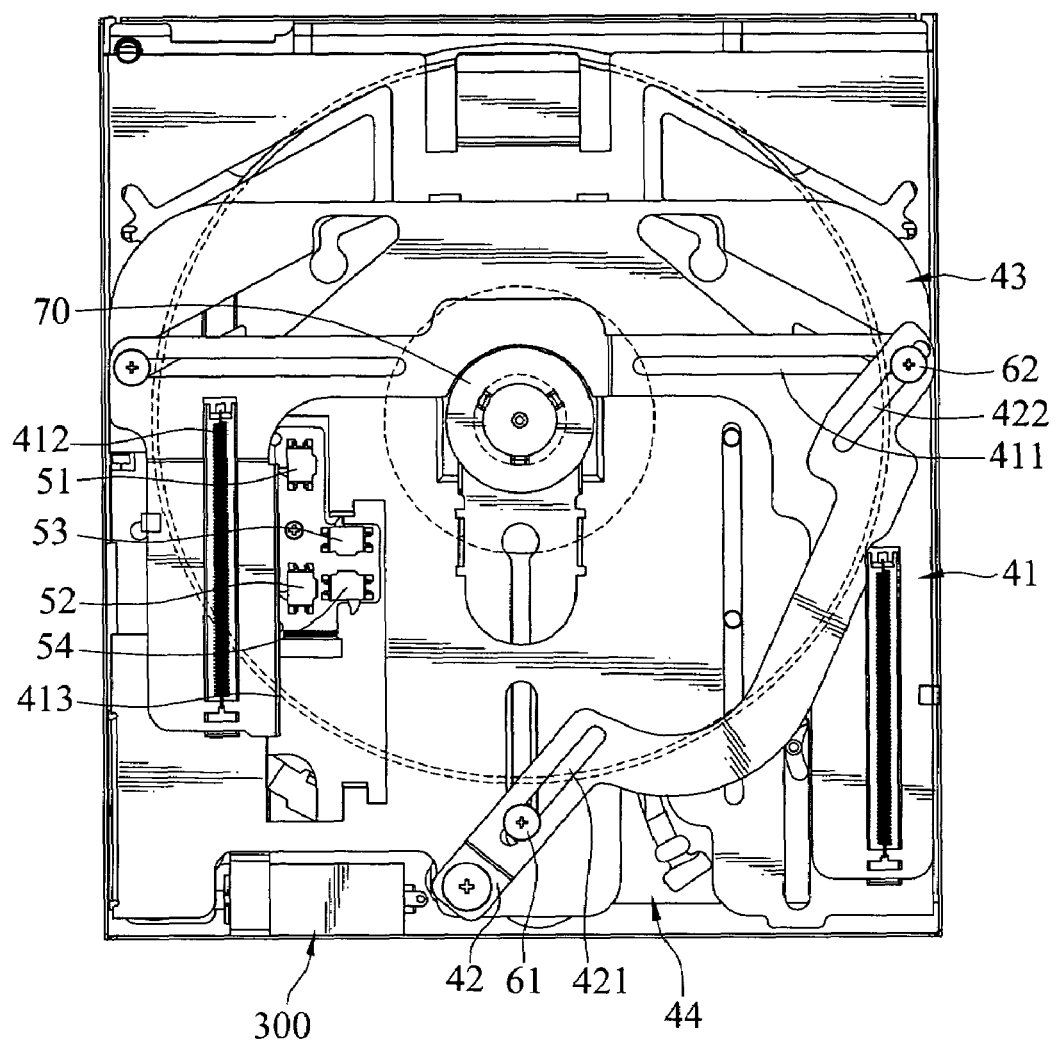

Once the disc is clamped and firmly positioned, the driving module 300 drives the moving plate 43 rearwards as shown in FIG. 6D. Meanwhile, the damper 70 of the optical disk drive is moved from its original elevated position, bucked by the bulged ridge 4351 of the moving plate 43 to avoid interference with the large disc 91, to a recess section 4352 for clamping the large disc 91 (also referring to FIG. 2). Next, the moving plate 43 is moved rearwards continuously until the rollers 62 and 63 are moved to the rear dead points 4423 of the main tracks 4425 of the track plate 44 so that the rollers 62 and 63 are located on positions greater than the diameter of the large disc 91 and the large disc 91 is freed from the clamping of the rollers 61, 62 and 63. The damper 70 then clamps the disc and the optical module 100 may start reading.

Figure 4:
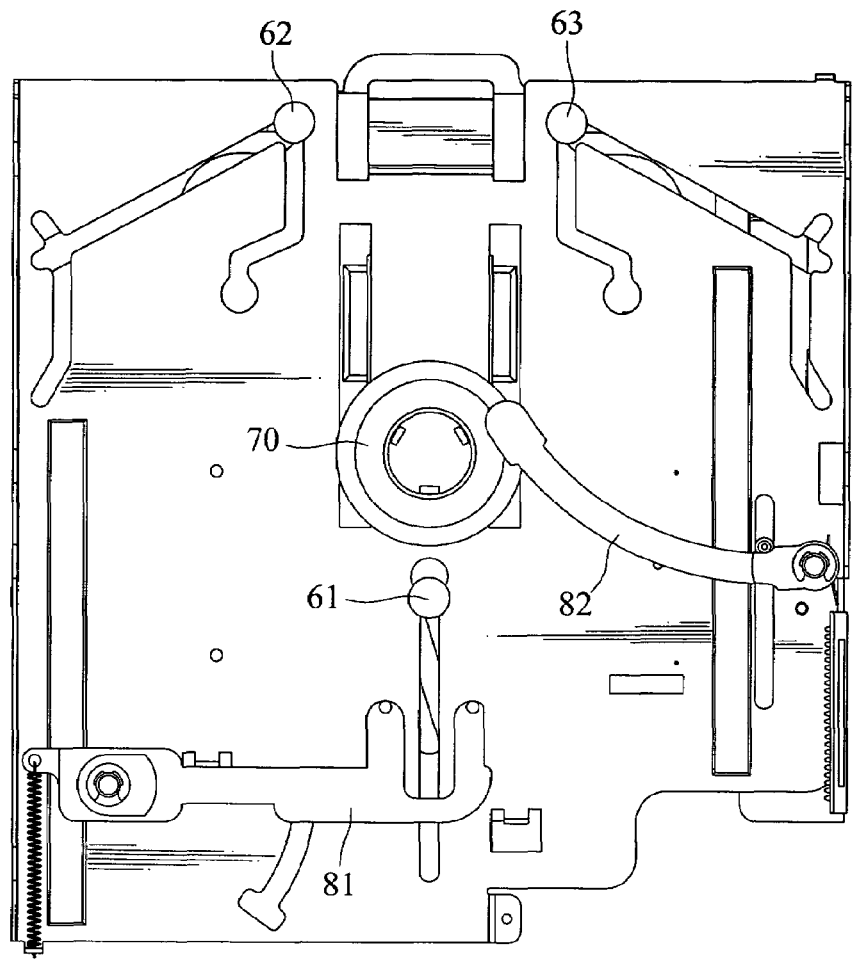
FIG. 4 is a rear view of the invention.
Figure 6E:
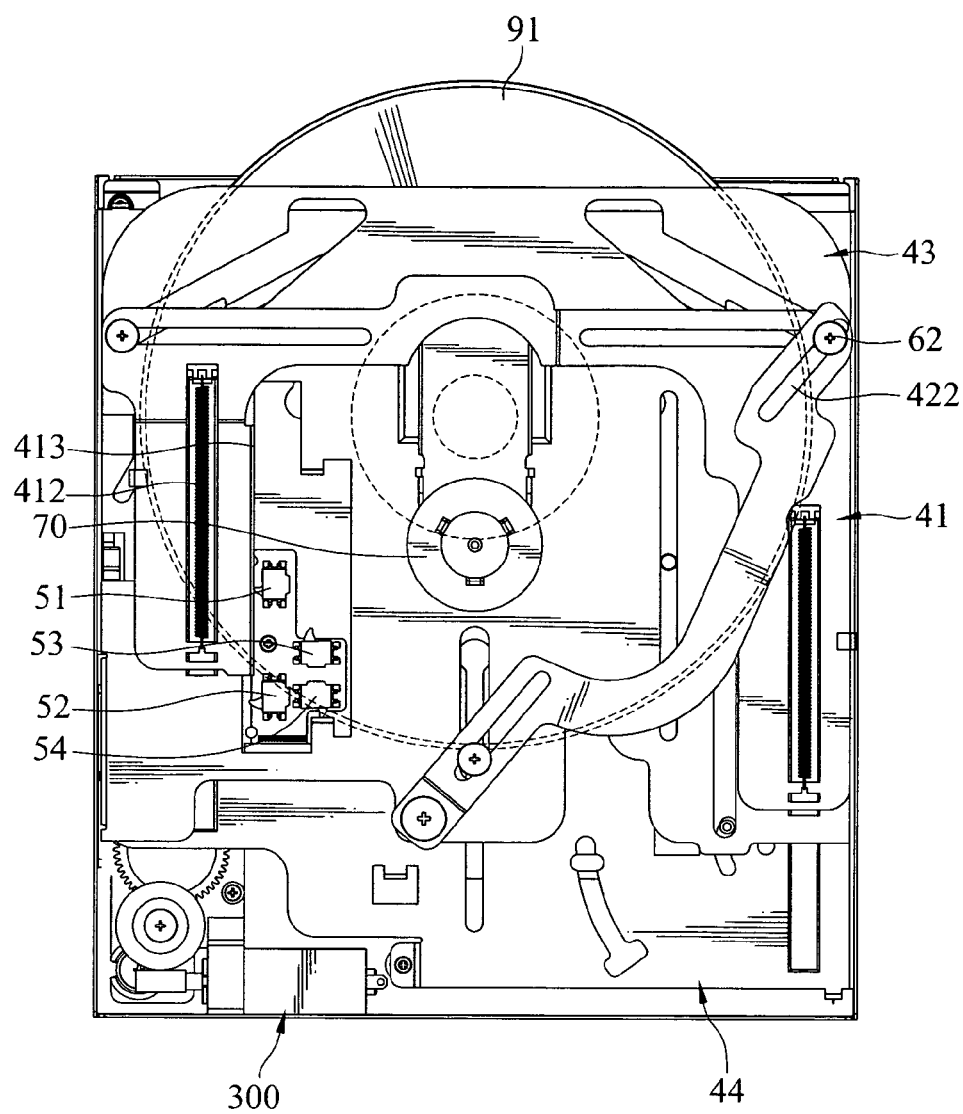
Figure 6F:
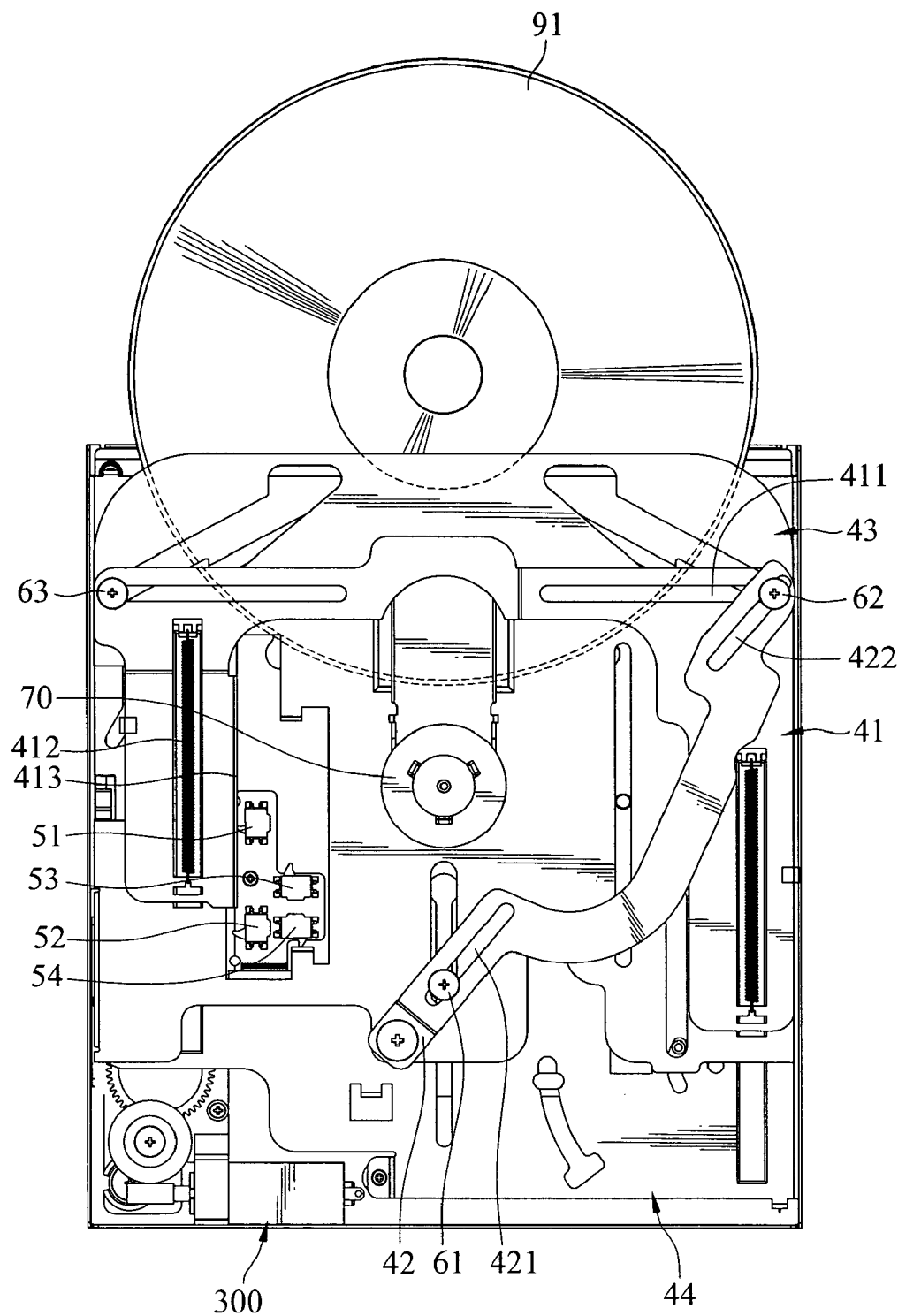
Figure 6G:
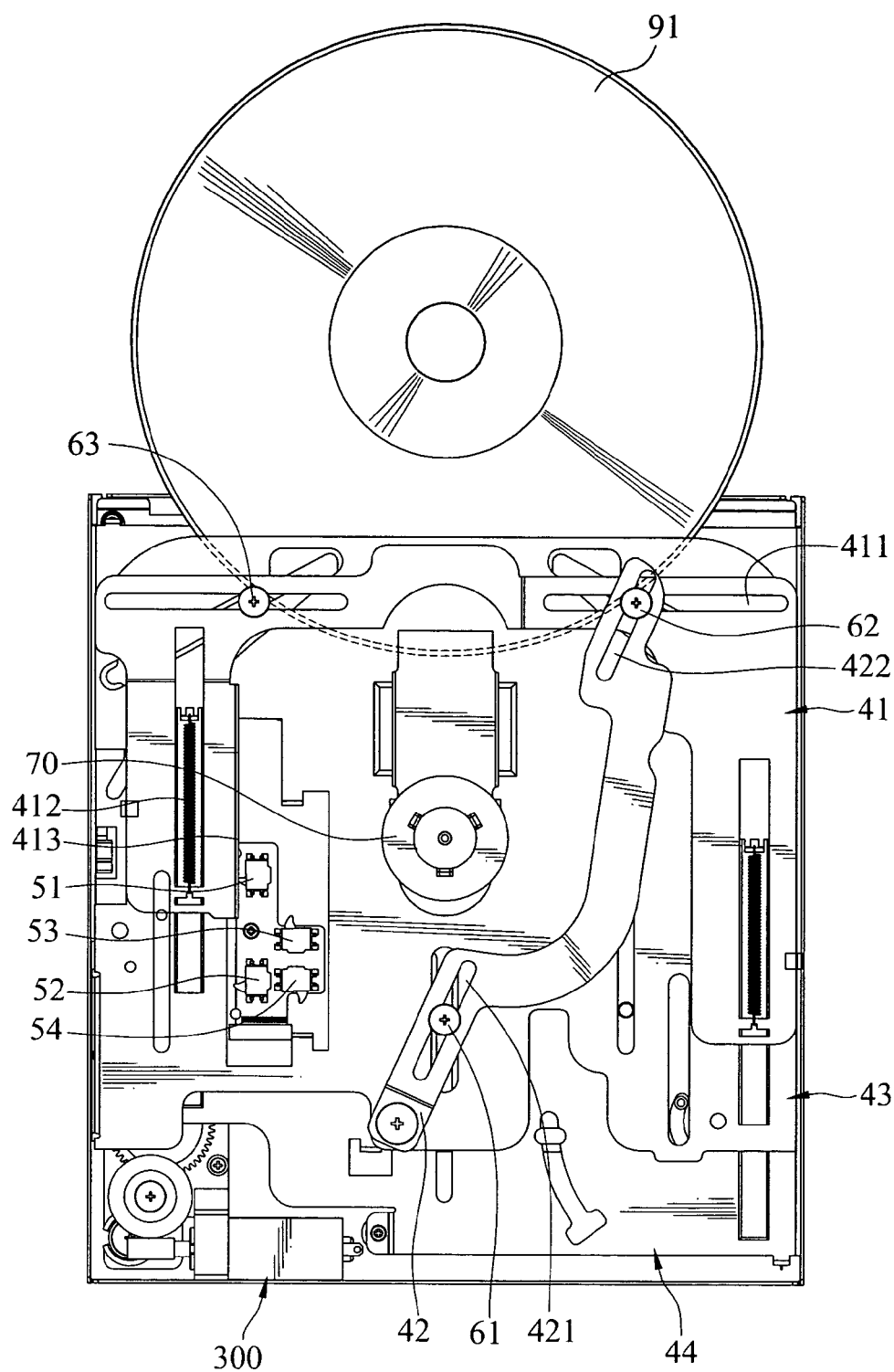
Figure 6H:
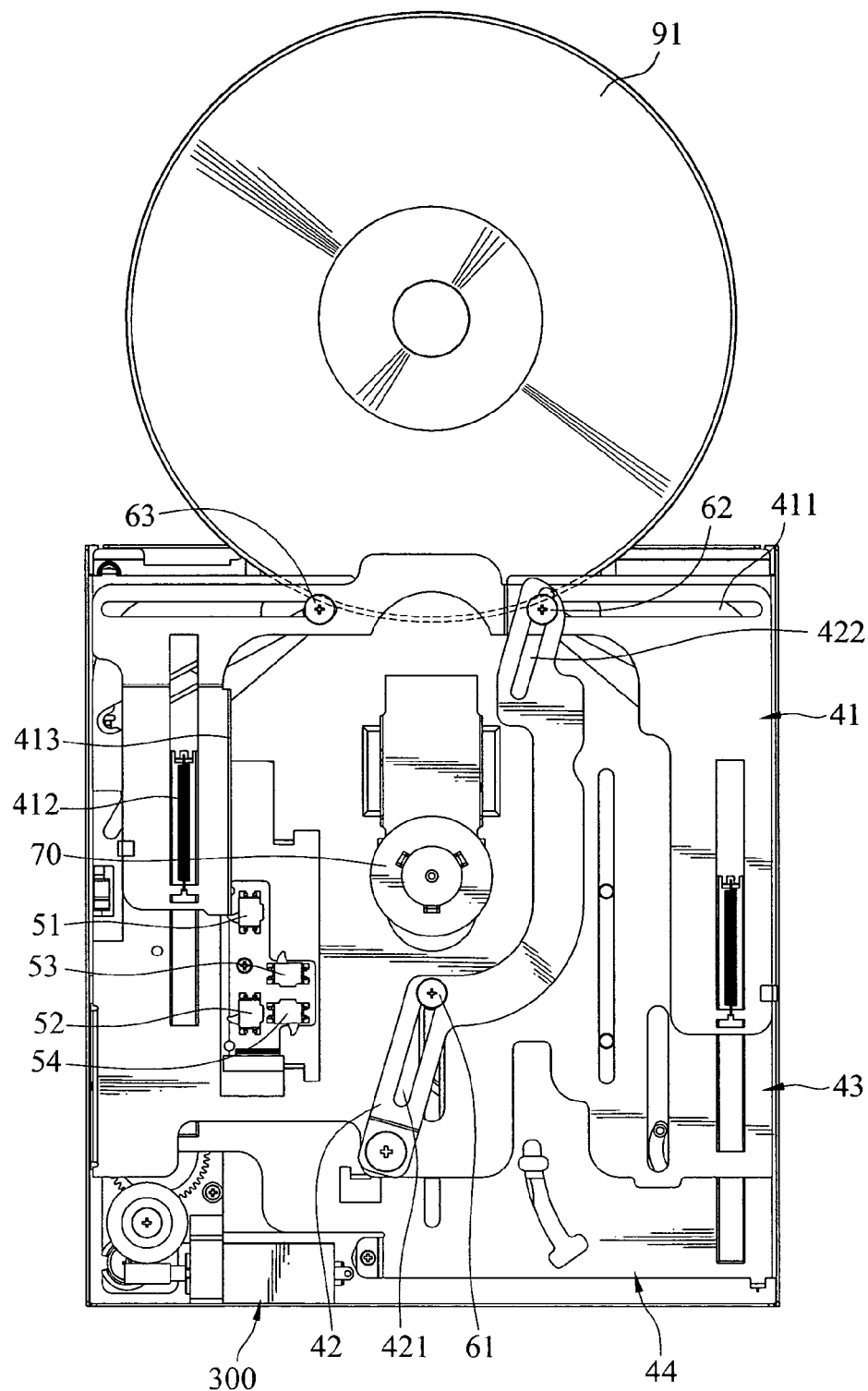

The present invention will become more fully understood from the detailed description given hereinbelow and the accompanying drawings which are given by way of illustration only, and thus are not limitative of the present invention, and wherein:

For ejecting the large disc 91, first, the large disc 91 is restored to the clamping condition by the rollers 61, 62 and 63; and the moving plate 43 is driven forwards to move the roller 62 outwards along the main track 4425 of the track plate 44 until reaching the front dead point 4422, as shown in FIG. 6E. At that condition the rollers 62 and 63 are moved away from the large disc 91, and an actuating member 82 is driven (referring to FIG. 4) to push the large disc 91 out at the first stage as shown in FIG. 6F. Then the moving plate 43 is driven back to the position of the main tracks 4425 of the track plate 44 (referring to FIG. 6G). The force of the spring 412 pulls the guiding plate 41 to drive the rollers 62 and 63 to push the large disc 91 out (as shown in FIG. 6H).

Figure 7A:
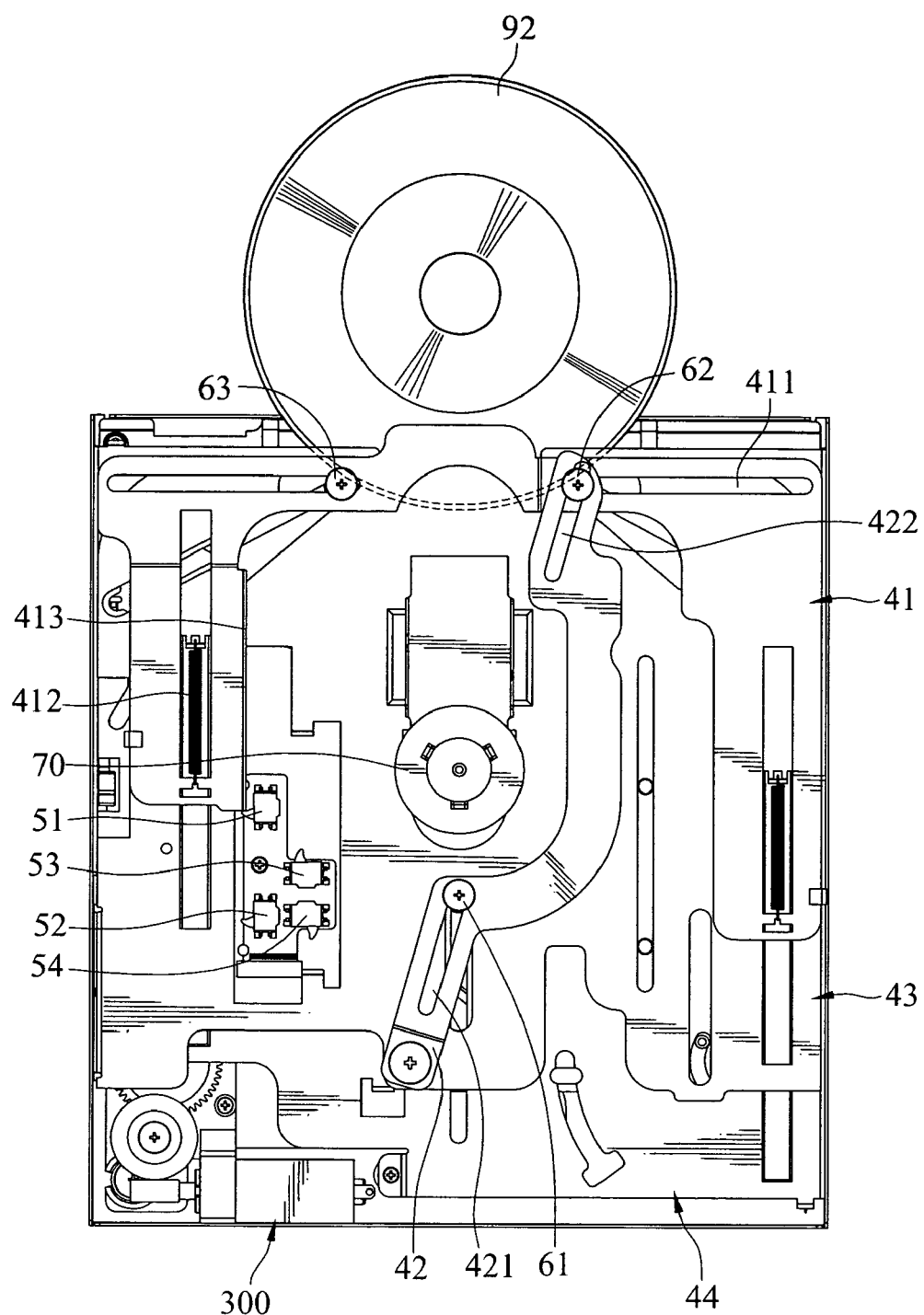
FIGS. 7A through 7H are schematic views of the invention in operating conditions adopted for small discs.
Figure 7B:
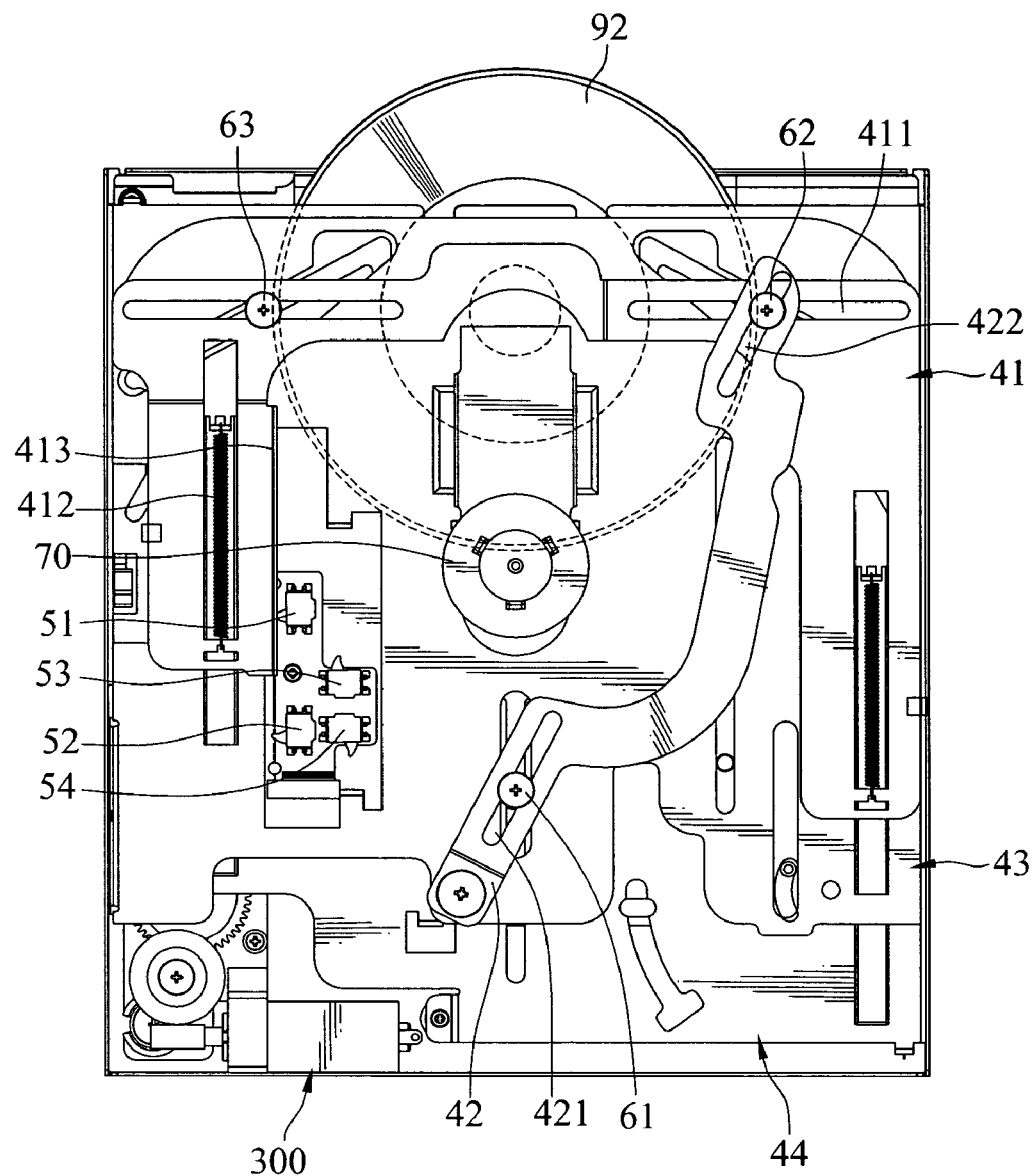
Figure 7C:
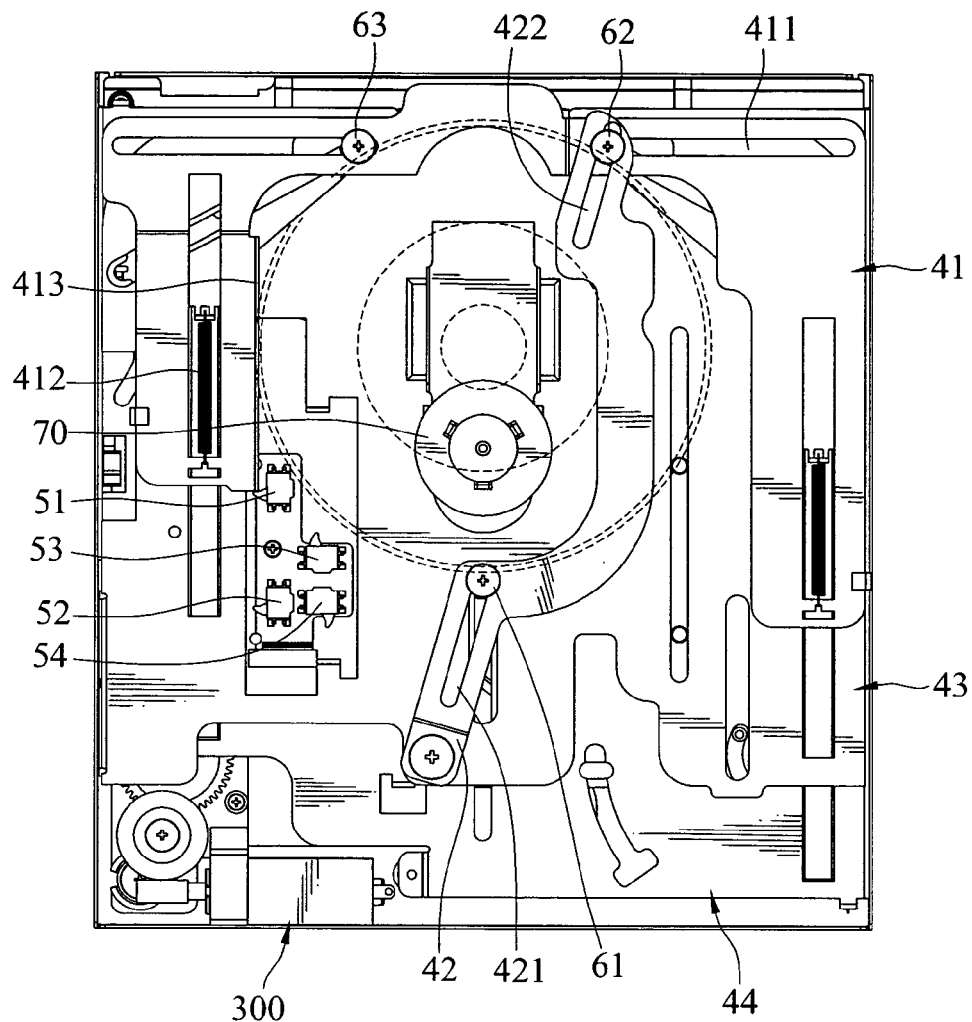

For small optical discs, the basic operation principle is the same as that for the large disc 91. First, a small disc 92 (the commonly used size is 8 cm) is inserted from the front end, as shown in FIG. 7A, to hit the rollers 62 and 63 (also referring to FIG. 8). Continuous inward movement of the small disc 92 pushes the rollers 62 and 63 to move. As the rollers 62 and 63 are constrained by the transverse tracks 411 of the guiding plate 41, moving tracks 431 of the moving plate 43 and guiding tracks 442 of the track plate 44, the rollers 62 and 63 are moved along the first tracks 4311 of the moving tracks 431 of the moving plate 43 and the main tracks 4425 of the guiding tracks 442 of the track plate 44 towards two sides. Meanwhile, the transverse tracks 411 of the guiding plate 41 are being pushed and the entire body is moved rearwards to stretch the spring 412, as shown in FIG. 7B. The roller 61 is also constrained by the guiding arm 42 and moved synchronously rearwards. When the small disc 92 is continuously moved inwards and has its largest diameter passing through, as the small disc 92 has a smaller diameter than the large disc 91, the rollers 62 and 63 are not being pushed to the side dead points 4421 of the main tracks 4425 of the guiding track 442 (referring to FIG. 7B). But similarly, after the largest diameter of the small disc has passed through, due to the spring 412, the guiding plate 41 is continuously moved forwards to convey the small disc 92 inwards (as shown in FIG. 7C) until the small disc 92 is clamped and anchored at three points by the three rollers 61, 62 and 63.

Figure 7D:
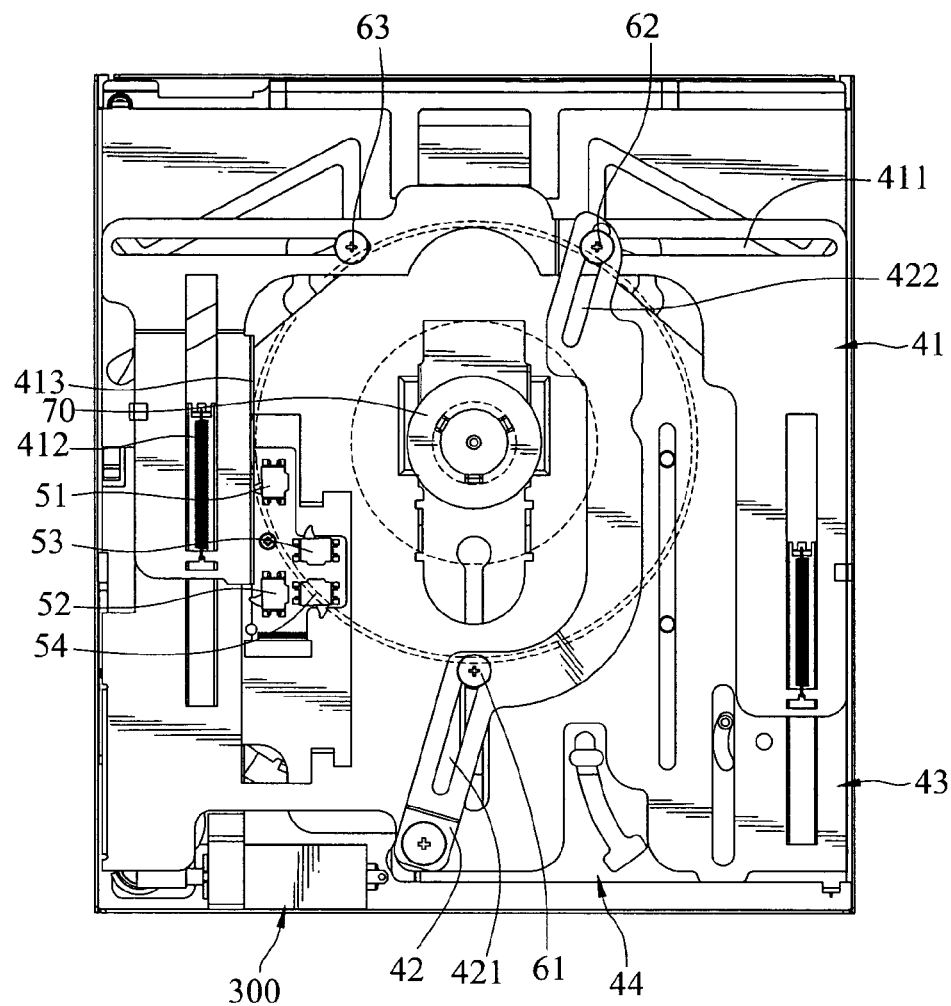
Figure 7E:
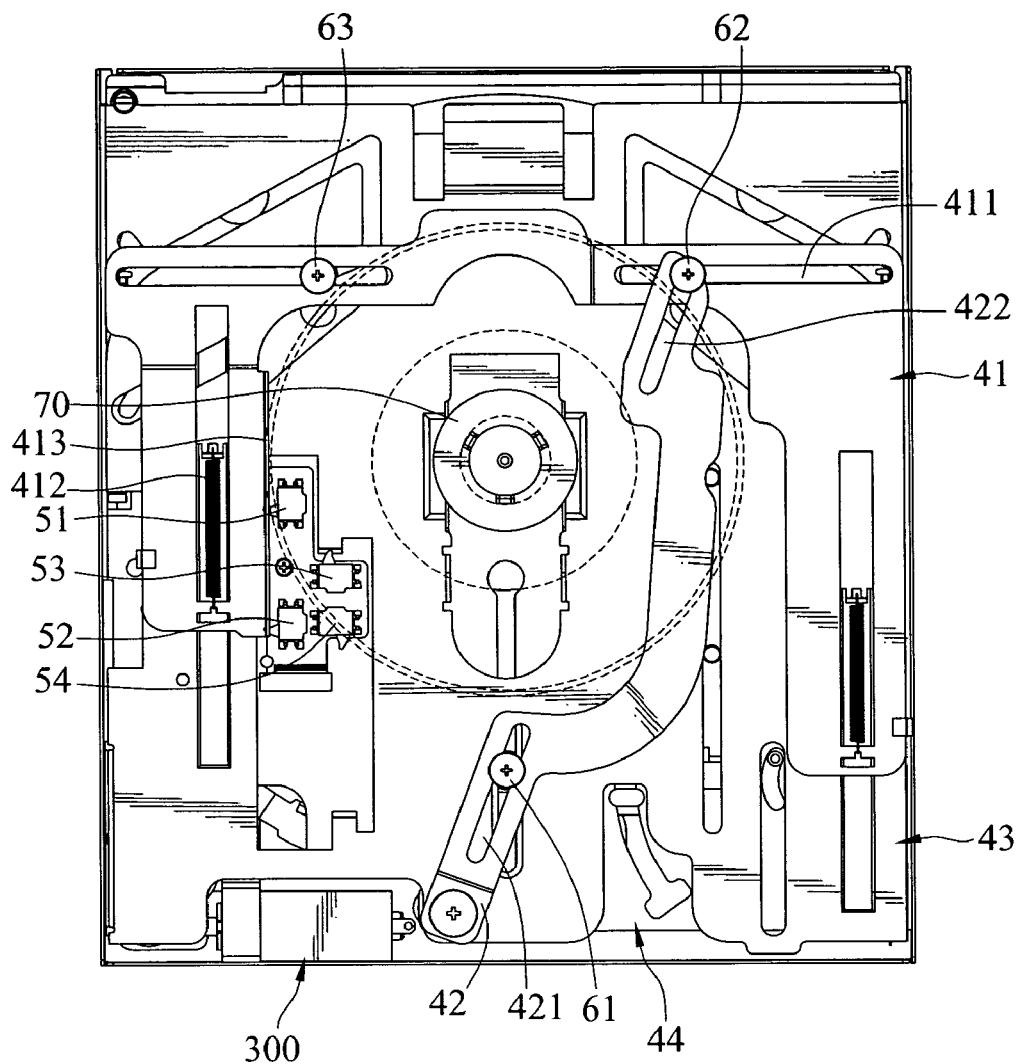

Once the disc is clamped and firmly positioned, the driving module 300 drives the moving plate 43 rearwards, as shown in FIG. 7D. Meanwhile, the damper 70 of the optical disk drive is moved from its original elevated position, bucked by the bulged ridge 4351 of the moving plate 43 to avoid interference with the small disc 92, to a recess section 4352 for clamping the small disc 92 (also referring to FIG. 2). Next, due the smaller size of the small disc 92, the roller 62 is moved along the secondary track 4424 of the track plate 44 (referring to FIG. 7E) until the rollers 62 and 63 are located on positions greater than the diameter of the small disc 92 and the small disc 92 is freed from the clamping of the rollers 61, 62 and 63. The damper 70 then clamps the disc and the optical module 100 may start reading. In addition, due the smaller size of the small disc 92, an anchor member 81 must be provided at the rear end of the track plate 44 (referring to FIG. 4) to anchor the small disc 92. In order to prevent the anchor member 81 from interfering with the large disc 91, it adopts a pivotal design so that interference may be avoided when the large disc 91 is moved rearwards.

Figure 7F:
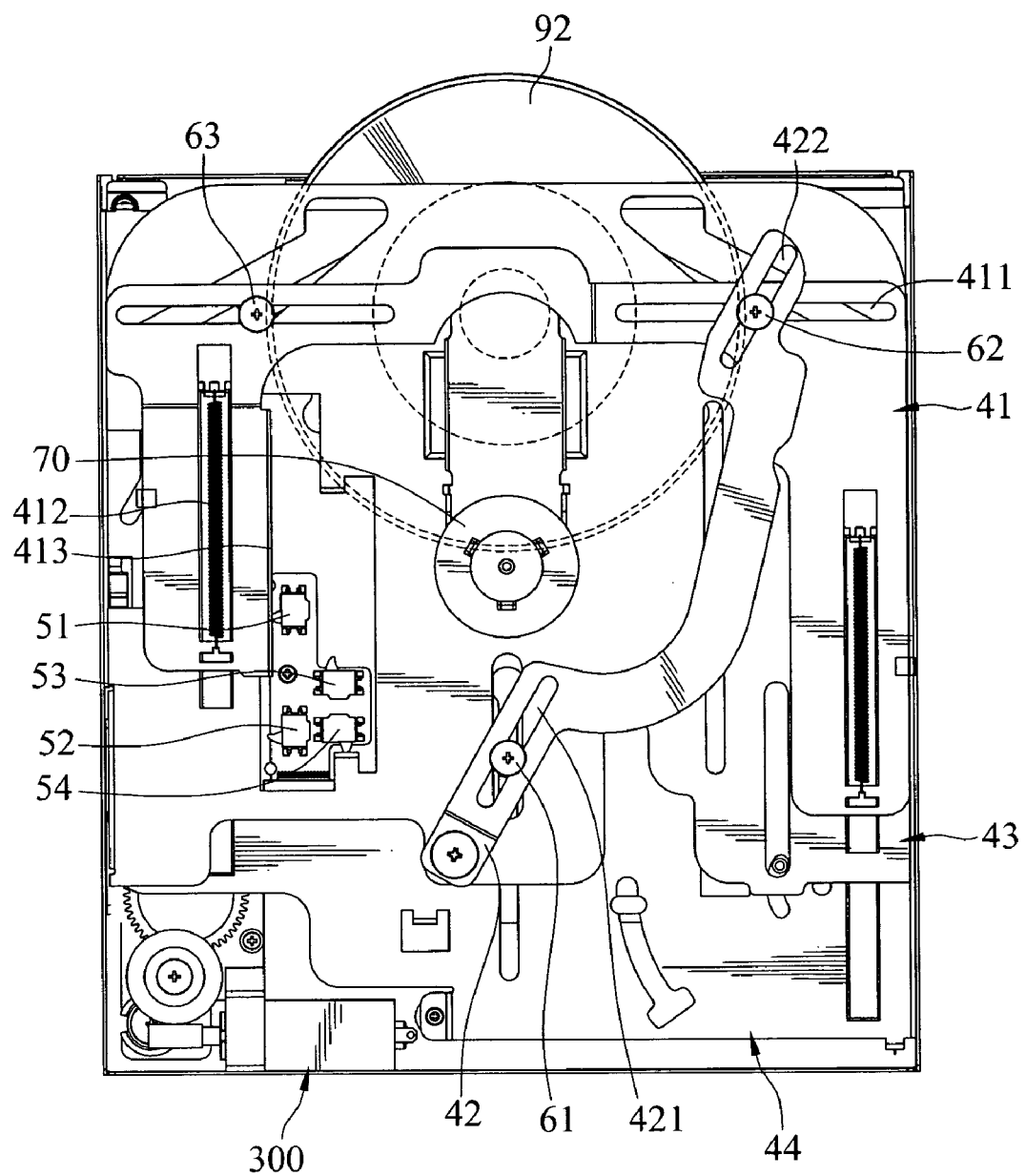
Figure 7G:
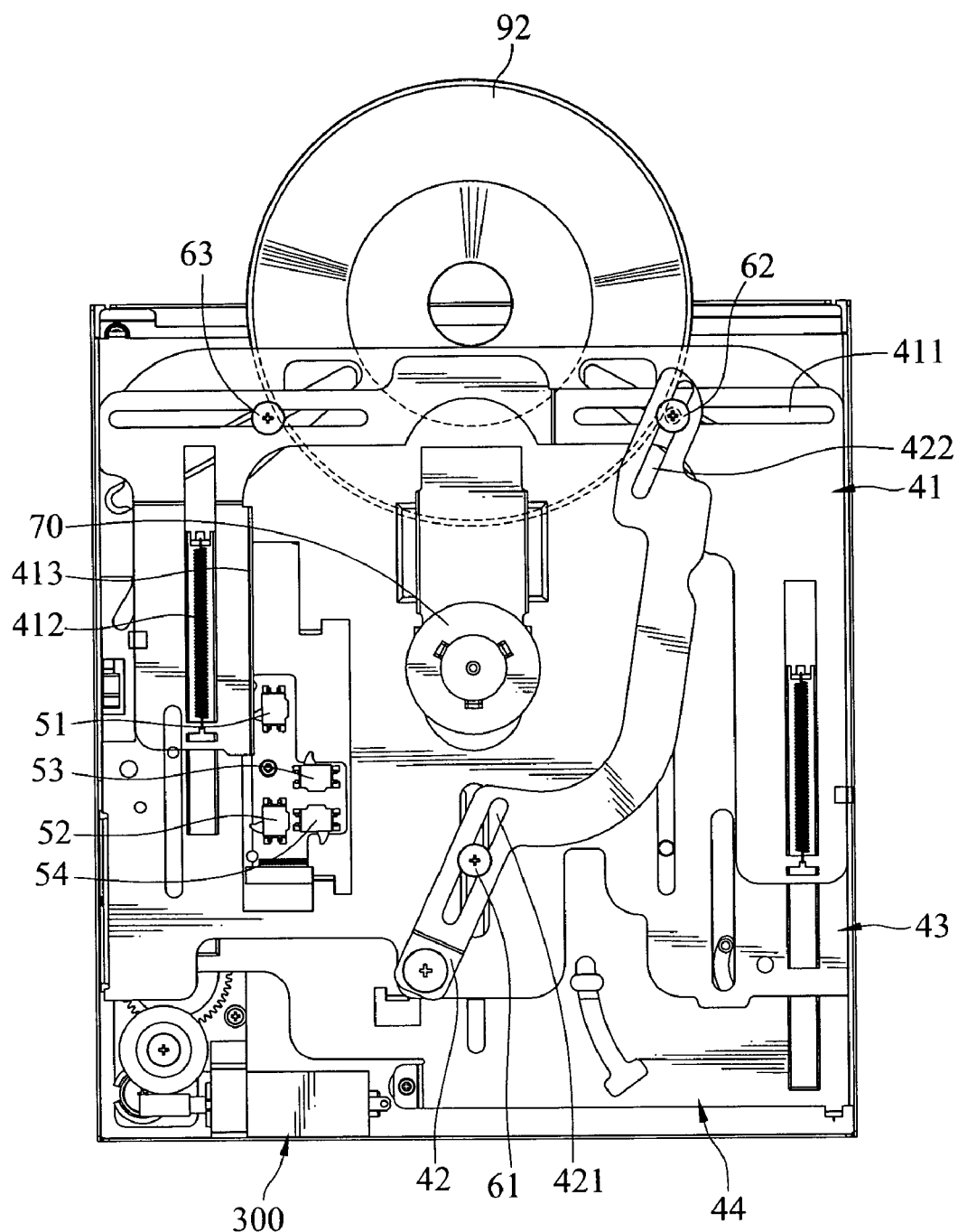
Figure 7H:
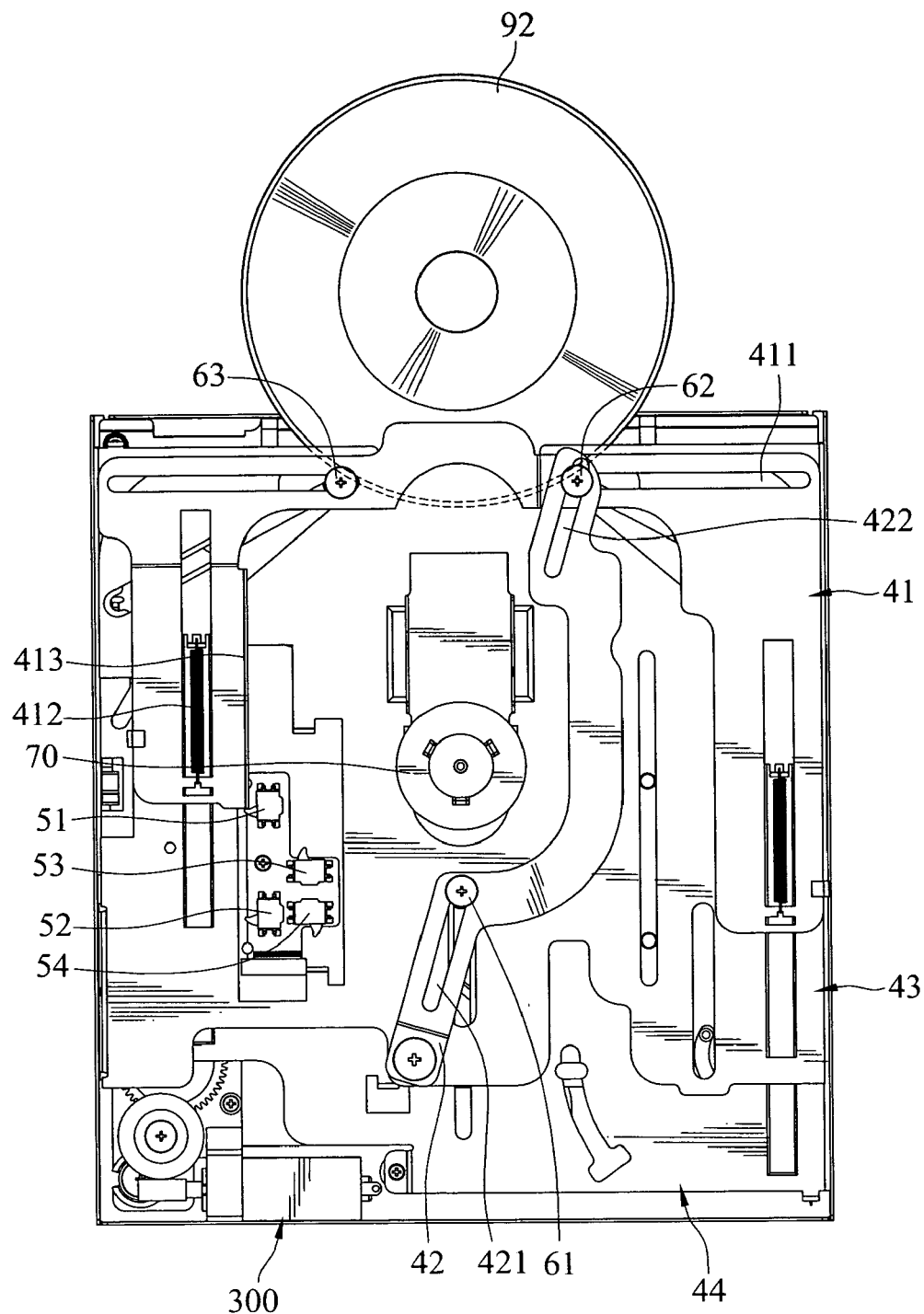

For ejecting the small disc 92, first, the small disc 92 is restored to the clamping condition by the rollers 61, 62 and 63, and the moving plate 43 is driven forwards to move the roller 62 along the secondary track 4424 of the track plate 44 until reaching the front end to be harnessed by the second track 4312 of the moving plate 43, as shown in FIG. 7F. At that condition the rollers 62 and 63 are moved away from the small disc 92, and the actuating member 82 is driven (referring to FIG. 4) to push the small disc 92 out at the first stage, as shown in FIG. 7G. Then the moving plate 43 is driven back to the position of the main tracks 4425 of the track plate 44, and the force of the spring 412 pulls the guiding plate 41 to drive the rollers 62 and 63 to push the small disc 92 out (referring to FIG. 7H).

Figure 8:
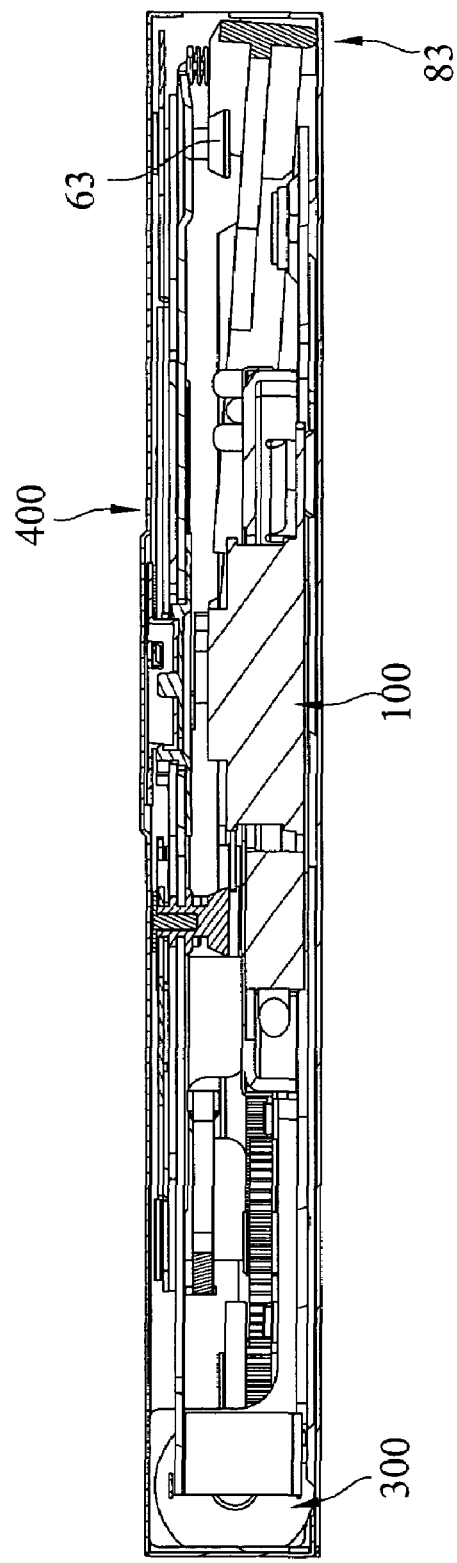
FIG. 8 is a schematic view of the stopping member of the invention.

As the invention is different from the conventional tray loading optical disk drives, a mechanism to prevent repetitive loading of disc must be provided. Refer to FIG. 8 for such a design. It includes a stopping member 83. After an optical disc is loaded, the stopping member 83 is moved upwards to close the entrance and exit of the disc so that repetitive loading of disc may be prevented.

Figure 9:
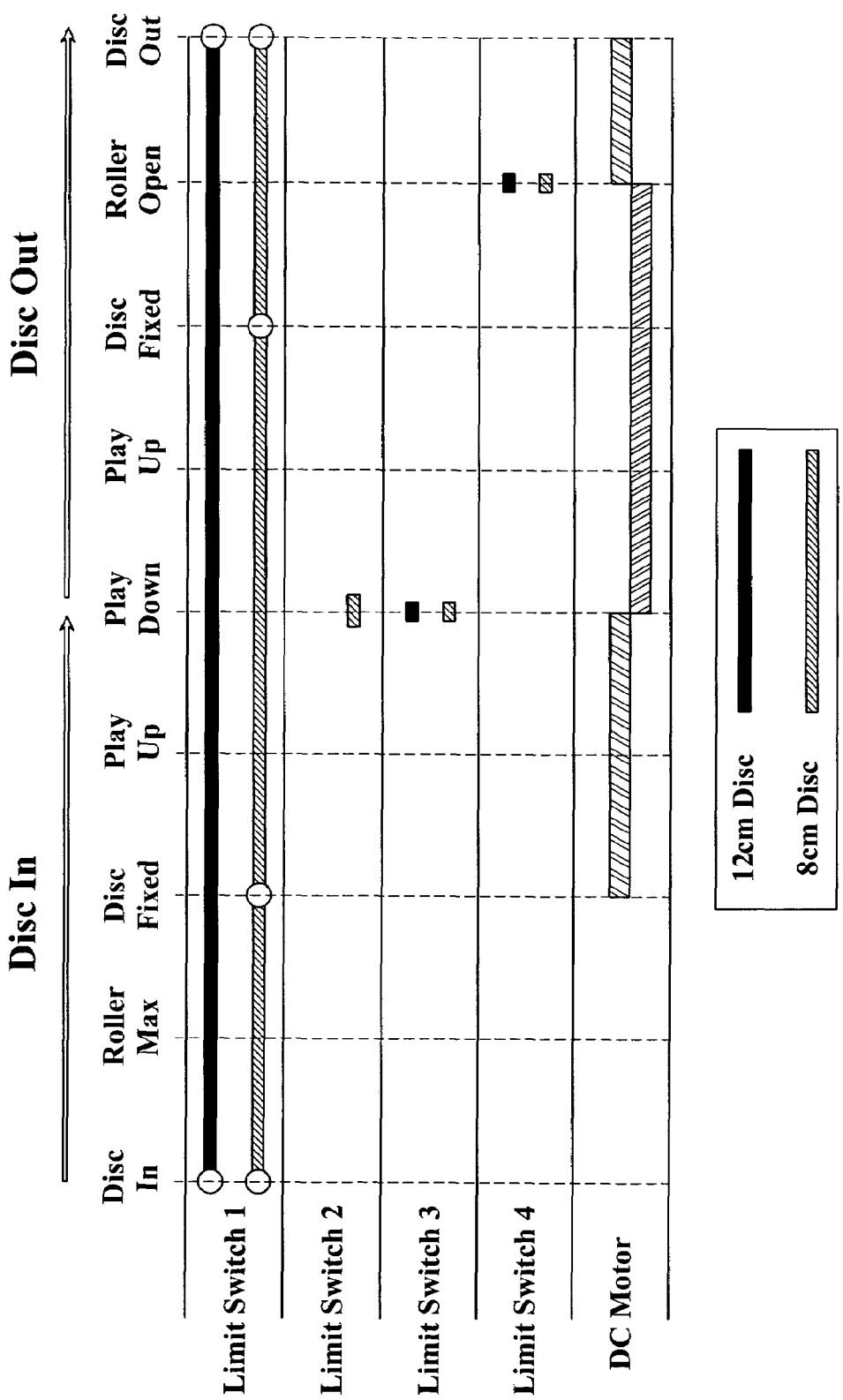
FIG. 9 is a control time sequence chart of the invention.

In addition, the detection module 500 may be used to precisely control the operation of the driving module 300. It is installed on the track plate 44, and mainly includes a first sensor 51, a second sensor 52, a third sensor 53 and a fourth sensor 54. As shown in FIG. 1B, the first sensor 51 and the second sensor 52 are mainly triggered by a bulged rim 413 of the guiding plate 41 to transmit signals to the control module and thereby control the driving module 300 to drive the moving plate 43 to a desired position and to indicate the current disc position. The third sensor 53 and the fourth sensor 54 are respectively activated by a first trigger plate 433 and a second trigger plate 434 of the moving plate 43. They mainly detect the driving of the moving plate 43 driven by the driving module 300 to indicate the position of the track plate 44. The control time sequence is shown in FIG. 9. Through the first sensor 51, second sensor 52, third sensor 53 and fourth sensor 54, the current position and condition of the disc can be precisely determined to accurately execute the driving movement.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A loading and unloading module for optical disk drives to transport an optical disc into or out of an optical disk drive, comprising:
   a track plate having a front end and a rear end, two guiding tracks located symmetrically on two sides of the front end and a rear track located on the rear end thereof;
   a moving plate movably located above the track plate having a bottom track on a rear end thereof corresponding to the rear track and two moving tracks symmetrically located on two sides corresponding to the guiding tracks;
   a guiding plate fixedly located above the moving plate having two transverse tracks located horizontally on two sides of a front end thereof;
   an elastic mechanism connecting to the moving plate and the guiding plate to allow the moving plate and the guiding plate to move elastically and reciprocally relative to each other;
   two front rollers movably coupled with the guiding tracks of the track plate, the moving tracks of the moving plate and the transverse tracks of the guiding plate;
   a rear roller movably coupled with the rear track of the track plate and the bottom track of the moving plate; and
   a guiding arm located above the guiding plate being movably and pivotally engaged with the moving plate, and having a rear end track to couple with the rear roller and a front end to couple with the front rollers.

2. The loading and unloading module for optical disk drives of claim 1, wherein each of the guiding tracks includes a main track and a secondary track, the secondary track communicating with a front end of the main track, the moving plate having a second track corresponding to the secondary track.

3. The loading and unloading module for optical disk drives of claim 2, wherein main track has a side dead point on the outmost side.

4. The loading and unloading module for optical disk drives of claim 2, wherein main track has a front dead point on a front end.

5. The loading and unloading module for optical disk drives of claim 2, wherein main track has a rear dead point on a rear end.

6. The loading and unloading module for optical disk drives of claim 1, wherein the moving track includes a first track and a second track, and the moving plate having an opening in the center.

7. The loading and unloading module for optical disk drives of claim 1, wherein the moving plate includes at least one anchor track, the track plate having a plurality of anchoring bulged spots corresponding to the anchor track and movable reciprocally in the anchor track.

8. The loading and unloading module for optical disk drives of claim 1, wherein the moving plate has respectively a clamping section on two sides to clamp the track plate.

9. The loading and unloading module for optical disk drives of claim 1, wherein the moving plate has a bulged ridge and a recess section corresponding to a damper of the optical disk drive to control the relative position of the damper to the moving plate.

10. The loading and unloading module for optical disk drives of claim 1, wherein the elastic mechanism is a spring.

11. The loading and unloading module for optical disk drives of claim 1 further having a guiding arm which has a front end track and a rear end track to couple respectively with the front rollers and the rear roller to control the rear roller to move synchronously with the front rollers.

12. The loading and unloading module for optical disk drives of claim 1 further having an actuating member to couple with the front rollers to move the disc out.

13. The loading and unloading module for optical disk drives of claim 1 further having a detection module to detect the position of the moving plate.

14. The loading and unloading module for optical disk drives of claim 1 further having a stopping member located on an inner side of a disc entrance to prevent repetitive disc loading.

15. The loading and unloading module for optical disk drives of claim 1 further having a detection module located on the track plate to detect the positioning condition of the guiding plate and the moving plate.

16. The loading and unloading module for optical disk drives of claim 15, wherein the detection module includes a first sensor, a second sensor, a third sensor and a fourth sensor, the guiding plate triggering the first sensor and the second sensor, the moving plate triggering the third sensor and the fourth sensor.

17. The loading and unloading module for optical disk drives of claim 16, wherein the first sensor and the second sensor are triggered by a bulged rim of the guiding plate, and the third sensor and the fourth sensor are triggered by a first trigger plate and a second trigger plate located on the moving plate.

* * * * *